United States Patent [19]

Welker

[11] Patent Number: 4,672,201
[45] Date of Patent: Jun. 9, 1987

[54] PHASE CONTROLLED INCREMENTAL DISTANCE MEASURING SYSTEM

[75] Inventor: Helmut Welker, Jamestown, N.Y.

[73] Assignee: Acu-Rite Incorporated, Jamestown, N.Y.

[21] Appl. No.: 798,166

[22] Filed: Nov. 14, 1985

[51] Int. Cl.[4] .......................... G01D 5/34; G01D 5/38
[52] U.S. Cl. ............................ 250/231 SE; 250/237 G
[58] Field of Search ...................... 250/231 SE, 237 G; 356/395

[56] References Cited

U.S. PATENT DOCUMENTS 4,461,083  7/1984  Ernst .............................. 250/237 G
4,533,830  8/1985  Beauprey ........................ 250/231 SE

FOREIGN PATENT DOCUMENTS

8320135  12/1983  Fed. Rep. of Germany .
3229846   2/1984  Fed. Rep. of Germany .

Primary Examiner—Eugene R. LaRoche
Assistant Examiner—David Mis
Attorney, Agent, or Firm—Toren, McGeady & Associates

[57] ABSTRACT

A device for detecting alternating light and dark areas of a Vernier or Moiré interference pattern. The device comprises a plurality of paired light sources and light detectors. The detector of each such pair is positioned to receive light from the corresponding source of each of such pairs. An opaque scale having transparent graduations and a grating having transparent graduations are included. The scale and grating are movable relative to each other and light from each light source is directed toward its corresponding detector through the scale and grating so that alternating light and dark areas in the form of an interference pattern are formed. The device also includes a light directing arrangement for independently allowing adjustment of the light emanating from each light source in a direction along a line passing through the light and dark areas and for allowing change of the amount of light received by the light detectors. The adjustments for phase and gain are substantially independent of each other. Certain embodiments allow the adjustment for gain to be made by moving the light directing arrangement in a direction approximately 90° to the line passing through the light and dark areas. Another embodiment adjusts for the amount of light by employing a shutter effect. The light directing arrangement permits independent adjustment during calibration of the amount and relative phase of light detected by each of the light detectors. A method for adjusting gain and phase of a measuring device using Vernier or Moiré interference patterns is also described.

20 Claims, 8 Drawing Figures

PHASE CONTROLLED INCREMENTAL DISTANCE MEASURING SYSTEM

BACKGROUND OF THE PRESENT INVENTION

1. Field of the Invention

This invention relates to the measurement of distances along transparent graduations on a scale by detecting alternating light and dark areas resulting from light passing through such graduations. More particularly, the invention relates to a device and method for detecting alternating light and dark areas in the form of an interference pattern resulting from light passing through transparent graduations along an opaque scale and through a grating having transparent graduations and arranged to move relative to the scale wherein the device comprises a plurality of paired light sources and light detectors and wherein the graduations of the scale and grating pass between the light source and the detectors.

2. Background of the Prior Art

In the prior art, a plurality of paired light sources and light detectors were utilized so that light could pass through transparent graduations in a scale between the light sources and light detectors. Commonly, an additional scale (a grating) was provided so that an interference pattern was formed by light passing through both of the scales to create alternating light and dark areas. A plurality of paired light sources and light detectors were used since increased measuring accuracy could be obtained because the plurality of light sources and light detectors could detect light passing through the transparent graduations in a phased relationship. For example, one of such pairs could receive light passing through transparent graduations, two additional light sources and light detectors could receive light which was partially cut off through the transparent graduations and one of the light sources and light detectors would receive essentially no light since an opaque portion of the scale covered the light source. The electrical signals generated by each paired light source and light detector therefor depended in magnitude and phase upon the particular position of the pair along the scale. Distances could therefore be approximated which were even smaller than the width of the graduations on the scale or the width of the light areas in an interference pattern formed by more than one scale.

Unfortunately, such measuring devices were exceedingly difficult to manufacture since the light sources and light detectors had to be closely aligned in relationship to the graduations on the scale in relationship to the alignment of the other light sources and light detectors relative to the scale. No simple means for making such alignment has been available in the prior art.

Interference patterns known to those skilled in the art include a Vernier fringe pattern, a Moiré fringe pattern or a stepped (or phased) fringe pattern. A Vernier fringe pattern is formed when the distance between the transparent graduations on the scales and grating are at slightly different intervals; thus light only passes through both scales when transparent graduations on both are aligned. A slight movement of one of the scales relative to the grating will change the amount of light passing through the transparent graduations at that point since the transparent graduations will no longer be in the same alignment. In a Moiré fringe pattern, generally the scale and grating have transparent graduations which are of the same spacing; however, the scale and grating are not in perfect horizontal alignment, thus the graduations of the scale cross the graduations of the grating in an "x" pattern. Light therefore only passes through the graduations where transparent graduations cross. Slight movement of the grating and scale relative to each other causes the location of the crossed graduations to change, thus setting up the Moiré fringe. A stepped fringe is similar to a Vernier fringe except that rather than different spacings between each graduation on the scale and grating, groups of graduations are changed in relative distance simultaneously. Thus, whole groups of graduations may be aligned or misaligned by movement of the scale and grating relative to each other.

The present invention is directed to adjustment of phase and amplitude relationships in Vernier and Moiré fringe devices and not in stepped fringed devices, where relative phase is not meaningful.

In one prior art device of the Vernier type manufactured by Bausch & Lomb known as the Acu-Rite ® device, phase was adjusted by rotating the index grating with respect to the scale. This was accomplished by providing a mechanical adjustment between the carriage which holds the index grating and the carriage top which rides on the scale edge. The phase angle between sine wave outputs from alternate paired light sources and light detectors could not be corrected without adjusting the gain. Furthermore, such an adjustment sometimes caused a misalignment between the light sources and light detectors.

In other prior art systems, such as the Heidenhain LS-803 and LS-903 devices, phase is adjusted by tipping a single light source and condenser lens assembly with respect to the grating, scale and photocells. This adjustment changes the phase angle between the two sine waves of alternate light detectors, but also affects the gains. Again, any movement of the light source or lens will affect the amount of the light falling onto the photocells, thus reducing incident light upon the cells. In other devices, adjustable set screws were provided to adjust light passing from the source to the detectors. These adjustments cannot effect adjustment of phase without also affecting the gain.

A further prior art system has been disclosed in German Gebrauchsmuster G 83 20 135.1, published on Dec. 8, 1983. There, an arrangement is shown for adjusting the light source in a length and angle measurement device. Such an arrangement, however, is believed to relate to a phased or step grating where the grating has the same pitch as the scale. There is no suggestion in the reference for applying the teachings to a Vernier or Moiré grating as in the present invention and to the problem of providing independent adjustment of gain and phase in such gratings.

Yet another prior art construction is disclosed in German Patent No. DE 3229846 C2. That patent also relates to a step or phased grating. Apertures are available to adjust the amplitude of the supplied light. This construction does not relate to the independent adjustment of phase without affecting adjustment of gain.

None of the prior art thus provided for mechanical adjustment to independently adjust gain and phase relationships between light sources and light detectors. In prior art devices for incremental distance measurement using optical transmission through transparent graduations, there were no means for adjusting the direction of light upon each of the detectors individually so that the phase between the output signals from the detectors as well as the linearity of each such signal could be aligned. Furthermore, no such device permitted the independent adjustment of the quantity of light incident upon each detector with the same member used for aligning the phase. Additionally, there was no device for accomplishing both the gain and phase adjustment easily and quickly and at low cost. Furthermore, no such means was provided which required a minimum of space to enable the device to be miniaturized.

An object of the present invention, therefore, is to provide means for adjusting the phase angle of each of a plurality of light sources and detectors individually and independent of gain so that the phase between detector output signals from each detector can be aligned.

Another object of the present invention is to provide means for independently adjusting the individual gain of each pair of light sources and detectors with the same member used for aligning the phase of pairs of light sources and detectors.

A further object of the present invention is to provide a device for accomplishing the adjustment of gain and phase of a plurality of light source and detector pairs by an arrangement which is low in cost, and which is quickly installed and adjusted.

A still further object of the present invention is to provide for adjusting the gain and phase of light source and detector pairs by an arrangement which requires a minimum of space to enable miniaturization of a transducer head containing the light source and detector pairs.

BRIEF DESCRIPTION OF THE INVENTION

In accordance with the invention, a device for detecting alternating light and dark areas such as are employed in Vernier or Moiré interference patterns comprises a plurality of paired light sources and light detectors, the detector of each of such pairs being positioned to receive light from the corresponding source of each of such pairs. The device includes an opaque scale having transparent graduations thereon and a grating having transparent graduations. The scale and grating are movable relative to each other. The light from each light source is directed toward its corresponding detector through the scale and grating so that alternating light and dark areas in the form of an interference pattern are formed. Light directing means are also included which are arranged to independently allow adjustment of the light emanating from each light source in a direction along a line passing through the light and dark areas. The light directing means thereby permits independent adjustment during calibration of the relative phase of light detected by each of the light detectors independent of the amount of light received by the light detectors.

The invention also encompasses a device as described above wherein the light directing means allows for adjustment of the relative phase and the amount of light received by said light detectors (gain), the relative phase and amount of light being adjustable substantially independent of each other.

Further, the present invention encompasses a method for adjusting the phase relationship of a plurality of paired light sources and light detectors in a device for detecting alternating light and dark areas resulting from light passing through transparent graduations along an opaque scale and transparent graduations in an opaque grating capable of moving relative to said scale; the light passing through said scale and grating forming a Vernier or Moiré interference pattern, and wherein the detector of each of the pairs is positioned to receive light from the corresponding source of each of the pairs. The method comprises the step of providing an independently adjustable light directing means for allowing direction of the light from source to detector for each of the pairs and the step of independently adjusting at least one of the light directing means during calibration of the device to direct light at various locations along a line passing across the light and dark areas and toward the detector so that relative phase of the light detected by the detectors may be changed without substantially changing the amount of light received by the detectors.

Still further, the present invention encompasses a method as described above wherein the method adjusts both phase and gain relationships and wherein the light directing means adjusts for both the amount of light and relative phase of the light detected by the detectors, such adjustment for relative phase and amount of light to be accomplished substantially independent of each other.

For a better understanding of the present invention, reference is made to the following description and accompanying drawings, while the scope of the present invention will be pointed out in the appended claims.

DESCRIPTION OF THE PREFERRED EMBODIMENTS

Figure 1:
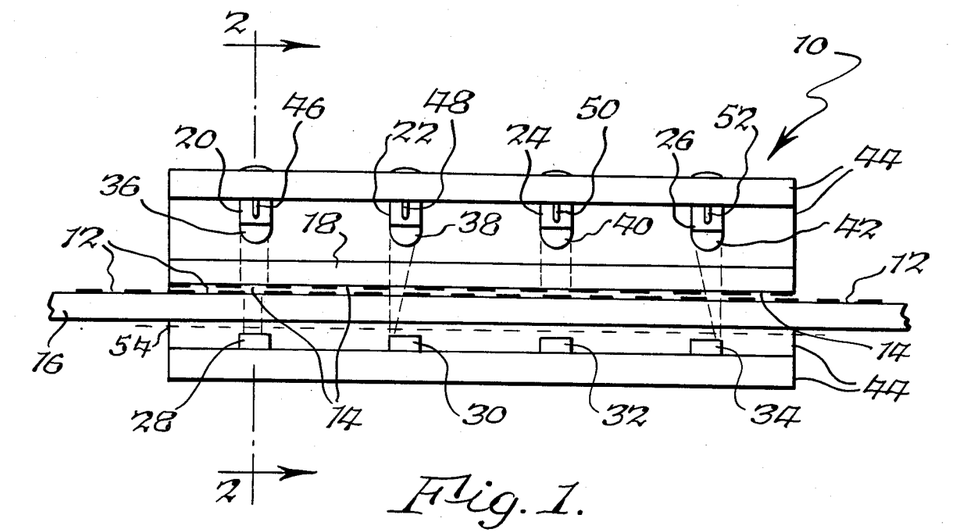
FIG. 1 is a front view of a device in accordance with the present invention showing paired light sources and light detectors, a scale and grating between the sources and detectors and also showing adjustment means.

Referring now to the drawings, FIG. 1 shows device 10 for detecting alternating light and dark areas resulting from light passing through transparent graduations 12 and 14 in scale 16 and grating 18, respectively. The preferred construction of the scale 16 and grating 18 is that of a Vernier device, although a Moiré arrangement is also possible.

The device is provided with a plurality of light sources 20, 22, 24 and 26, which are paired with detectors 28, 30, 32 and 34, respectively, in the form of photocells. Device 10 and scale 16 are movable relative to each other such that the graduations 12 of scale 16 pass between sources 20, 22, 24 and 26 and detectors 28, 30, 32 and 34. The device is further provided with light directing means 36, 38, 40 and 42 which are integral with light sources 20, 22, 24 and 26, respectively.

Light sources 20, 22, 24 and 26 are attached to frame 44 of device 10 by means of lead wires 46, 48, 50 and 52, respectively. Light directing means 36, 38, 40 and 42, shown in the form of lenses, are independently adjustable by moving them such that wires 46, 48, 50 and 52 bend. After movement, light directing means 36, 38, 40 and 42 retain their position due to the strength of the wires. Such adjustment is useful during calibration to redirect light beam emanating from each light source to a limited degree of the beam by movement in a direction along a line 54 passing across light and dark areas formed by light passing through transparent graduations 12 and 14. Movement of the light directing means in a direction substantially 90° to line 54 will effect change of gain by changing the amount of light falling on the detectors.

The light is directed from light sources 20, 22, 24 and 26 through lenses 36, 38, 40 and 42, respectively, toward detectors 28, 30, 32 and 34, respectively, through the transparent graduations when such graduations are appropriately aligned to permit light to pass through them. The ability to move light directing means 36, 38, 40 and 42 so as to redirect the respective light beam in a direction along line 54 permits an adjustment in the phase relationship of electrical current generated by detectors 28, 30, 32 and 34 as a result of controlling the location of incident light reaching the detectors through graduations 12 and 14. The movement of the beam in a direction substantially 90° to line 54 will change the amount of light received by a particular detector. The two adjustments, relative phase and gain, may be effected independent of each other.

Figure 2:
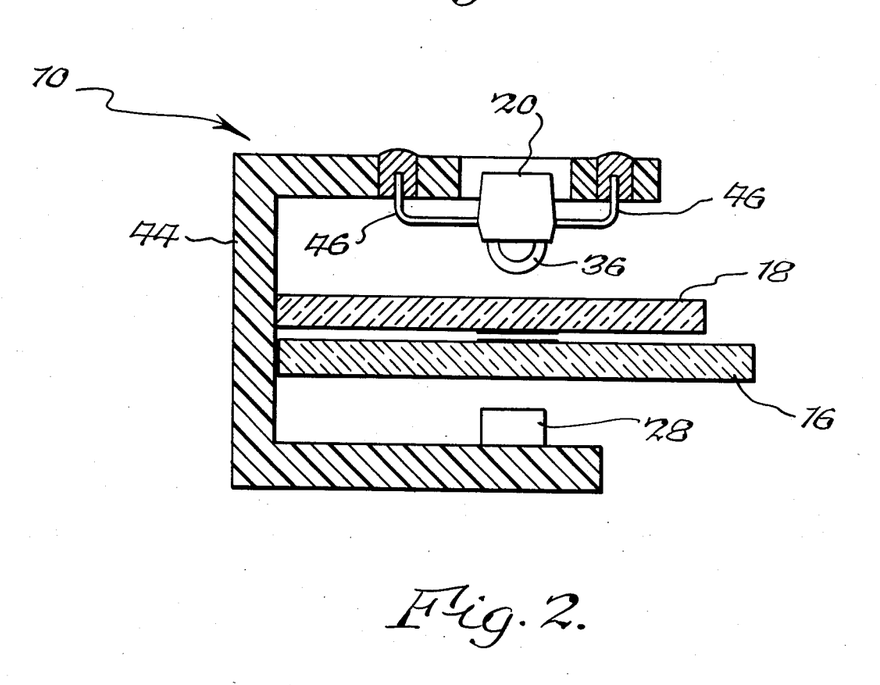
FIG. 2 is an end cross-sectional view of FIG. 1 taken on line 2—2 of FIG. 1.

Adjusting means 46 is better seen in FIG. 2 wherein it is clear that movement of adjusting means 46 in the form of a wire permits motion of light source 20 and light directing means 36 which, in turn, controls the direction of light toward detector 28.

Figure 2A:
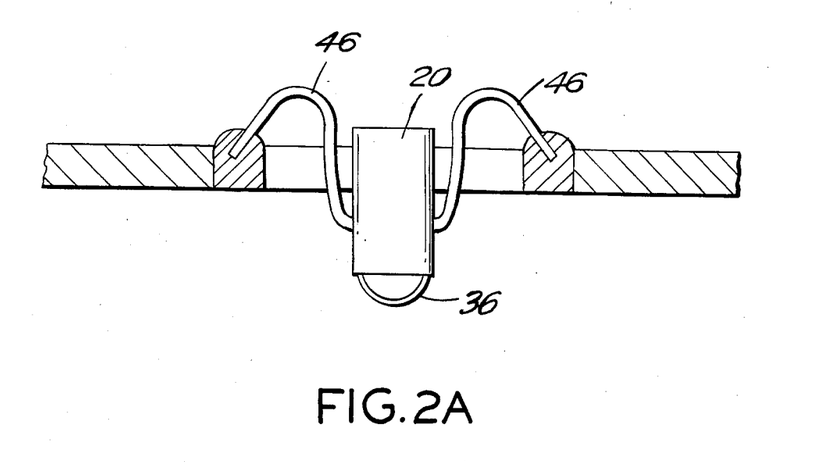
FIG. 2A is a plan or front view of a variation of the embodiment shown in FIG. 2.

FIG. 2A represents a variation of the embodiment of FIG. 2. In this embodiment, the light energy source 36 is mounted in such a way that the adjusting means or leads 46 take a hook-shaped form. This results in a hinge-like effect to enable easy adjustment of the source 36 as to phase (along line 54 or left-right) and amplitude (90° to line 54 or up-down).

It should be understood that movements of the light sources (20, 22, 24, 26) in a direction along line 54 results in no change in gain since such movements are very small and essentially all of the directed light remains in the field of the respective detectors (28, 30, 32, 34). When the gain is adjusted and the source is moved in a direction substantially 90° to line 54, gain is changed by having part of the light directed off the field of the detector.

Figure 3:
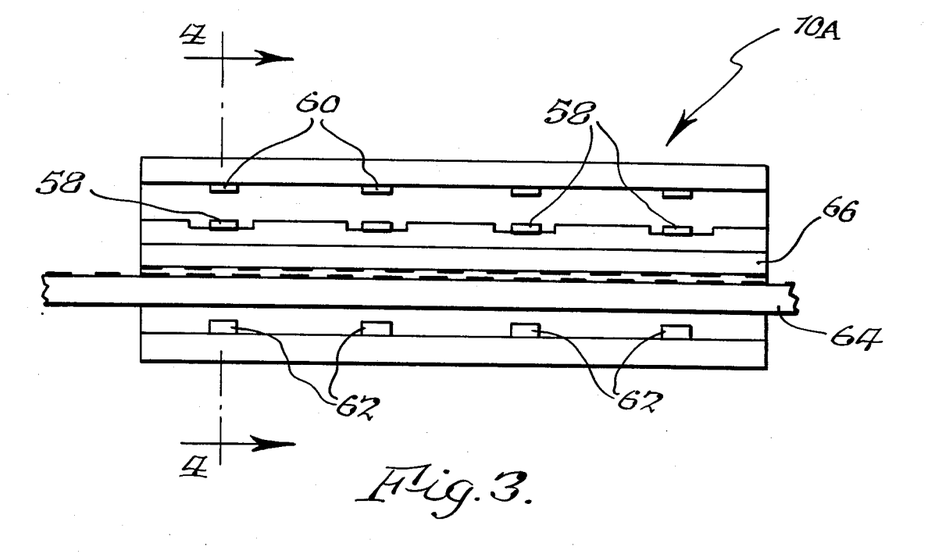
FIG. 3 is a front view of an alternative embodiment of the invention showing an adjustable lens as the light detecting means.
Figure 4:
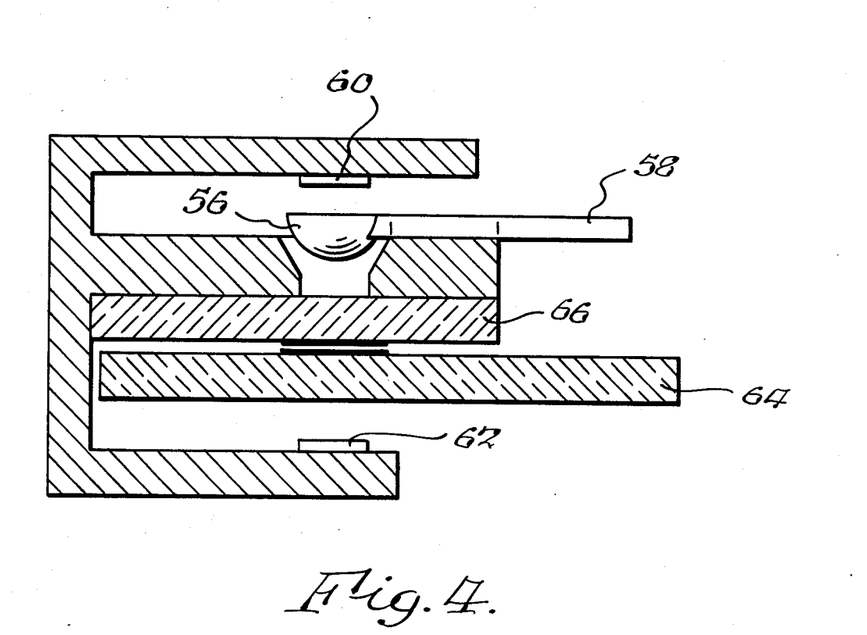
FIG. 4 is a cross-sectional end view on line 4—4 of FIG. 3.

FIGS. 3 and 4 shows an alternative embodiment 10A of the invention wherein a lens 56 (seen in FIG. 4) having a handle 58 is interposed between a light source 60 and a light detector 62. The handle 58 may be supported by springs or clips (not shown). The light source 60 is in the form of a light emitting diode and the light detector 62 is a photocell. A scale 64 having transparent graduations is interposed between lens 56 which acts as the light directing means and the detector 62. Similarly, a grating 66 is provided between the lens 56 and the scale 64 to provide an interference pattern in conjunction with scale 64, since grating 66 is similarly provided with transparent graduations. Adjustment of the position of lens 56 by means of handle 58 alters the direction of light from light emitting diode 60, in a direction along line 54, toward detector 62. Thus, when a plurality of such lenses and handles are provided, the phase relationship between current generated by photocells, such as photocell 62, can be adjusted by moving each respective handle 58 in a direction along line 54. The gain of each paired light source and detector may be changed by moving each handle in a direction substantially 90° to the direction moved to adjust phase.

Figure 5:
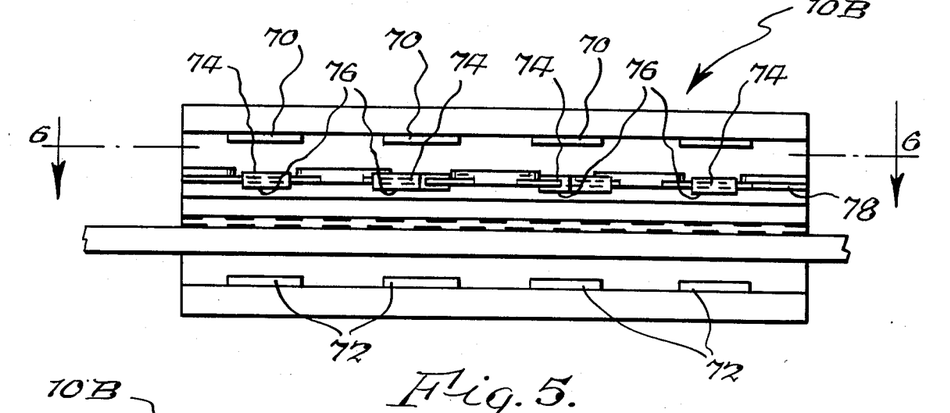
FIG. 5 is a front view of a further alternative embodiment of the invention showing aperture clips operating in conjunction with apertures as the light directing means.
Figure 6:
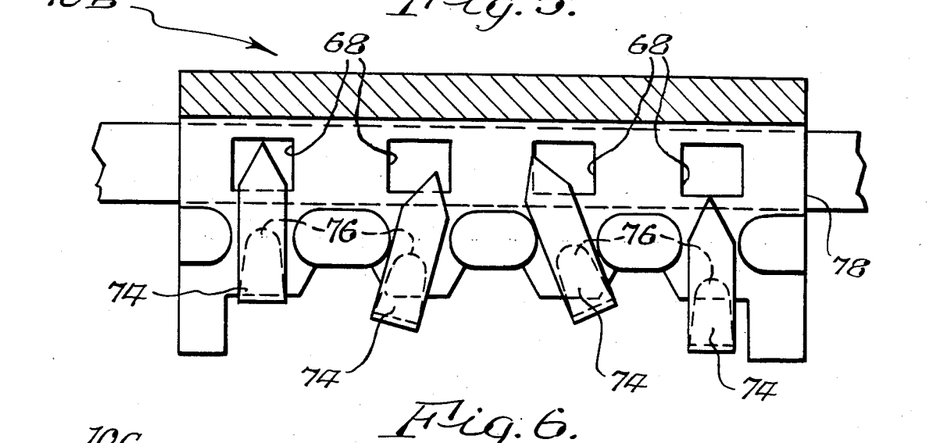
FIG. 6 is a cross-sectional top view taken on line 6—6 of FIG. 5.

Another embodiment of the invention 10B is shown in FIGS. 5 and 6 wherein apertures 68 are provided between light sources 70 and light detectors 72. Clips 74 are provided which can be moved to obstruct light at various areas of apertures 68, thus directing light from the light sources 70 to various locations on the detectors 72. Aperture clips 74, acting as shutters, are provided with springs 76 which grip screens 78 interposed between the light sources 70 and light detectors 72. Springs 76 act as a means to temporarily render the aperture clips 74 position stable after an adjustment.

The clips may be interposed at the sides of the apertures to adjust the phase. This changes the center weighting of the integrated light received by each detector and has the effect of adjusting the phase by a corresponding angle. The gain adjustment is effected by reducing the total amount of light allowed to pass through the apertures with the clips acting as shutters.

Figure 7:
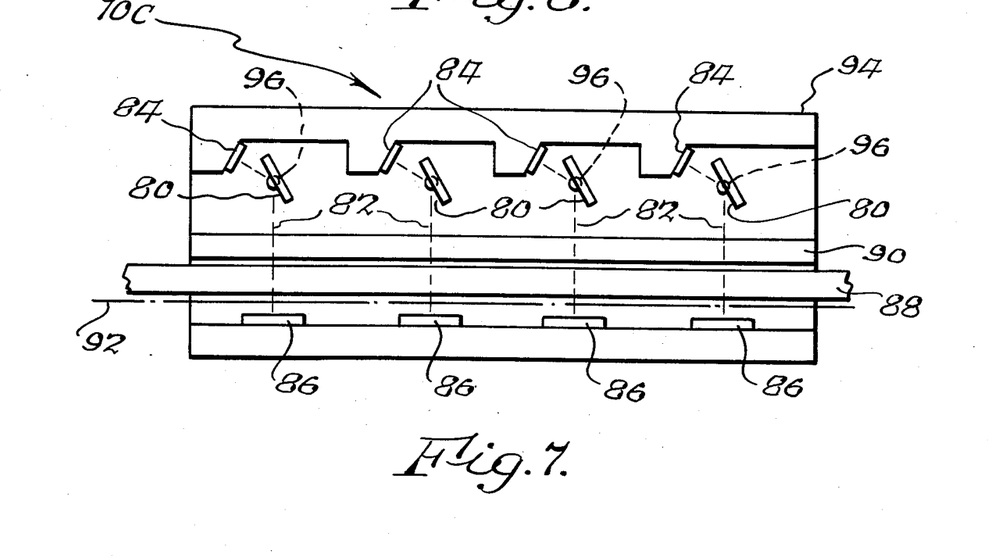
FIG. 7 is a further alternative embodiment showing mirrors used as the adjusting means.

FIG. 7 shows an embodiment 10C wherein mirrors 80 are provided as the light directing means to direct light 82 from light source 84 in the form of a light emitting diode to a detector 86 in the form of a photocell. A scale and a grating 88 and 90 are interposed between the mirrors 80 and the detectors 86. Adjustment of the mirrors 80 causes a shift in the direction of the light 82 from the light sources 84 so that adjustment can be made in the phase relationship between a plurality of such light sources 84 and light detectors 86 since, as previously discussed, light 82 can be directed along a line 92 which crosses the transparent graduations in the opaque scale 88 and in the grating 90. Movement of each mirror in a direction substantially 90° to the direction for adjustment of phase is used to adjust the gain. Mirrors 80 are secured to frame 94 by means of spring screws 96 which allow adjustment of the mirrors 80 and which permit the position of the mirrors to be temporarily held position stable.

In accordance with the present invention, a device has been described for detecting when it passes over alternating light and dark areas to permit electronic counting or other electronic analysis of such areas so that distance along a scale containing transparent graduations can be determined. The alternating light and dark areas are interference patterns formed by the scale and a grating incorporated in the device also having transparent graduations. The grating is attached to and moves with the device relative to the scale. "Light and dark" areas as used herein refer to the presence or absence of light passing through the scale and grating if present. The "light" may be visible light or any other radiation such as ultraviolet or infrared radiation. "Opaque" means opaque to the radiation provided by the source and "transparent" means transparent to radiation provided by the source.

The scales and gratings which are used may be any suitable material which will pass light. Usually the graduations are formed by placing an opaque substance upon a transparent base and removing a portion of the opaque material at spaced intervals. Such removal is often accomplished by placing a photo-resist material over the opaque material, exposing the photo-resist material to light passing through a graduation pattern and removing material which was not cross-linked by exposure to light. The opaque material is then etched from the scale or grating at the locations where it is not protected by the photo-resist material.

In order to detect the light or dark areas to provide a signal for analysis to determine distance along the scale, a plurality of paired light sources and light detectors are provided. The light sources are separate sources of light to provide light to its corresponding light detector. The source of light may be any suitable light source, such as a light emitting diode for each such light source, or a single filament lamp screened by an opaque material provided with a plurality of holes through the material to provide independent light sources through each of the holes for each corresponding detector. In general, the light detector is a photocell.

As previously mentioned, each light source is paired with a corresponding light detector so that light passing from the source to its corresponding detector has to pass through the scale and grating, which are between the source and detector. Therefore, as the scale is moved relative to the device, light is alternately permitted to strike the detector and then is screened from the detector by opaque portions of the scale. "Between" the source and the detector is defined herein as being at a position which intercepts the light path between the source and the detector. The path is usually a straight line but may be altered by mirrors or prisms.

As a practical matter, the amount of light striking the detector does not suddenly change from a large amount of light to essentially no light but, in fact, as the scale is moved, the light is gradually screened off from the detector by opaque scale portions. The electrical current provided by the detector therefore moves from a relatively high current when a large amount of light is striking the detector to lower or even no current when the light is screened from the detector with intermediate amounts of current being provided by the detector when the light is only partially screened. Each detector therefore produces an electrical waveform having highs and lows as the scale is moved.

In accordance with the present invention, a light directing means which may comprise one or more of a collimator, shutter, lens, prism or mirror, is provided to direct light from the source to its corresponding light detector. Each such light directing means is independently adjustable during calibration so that the amount and waveform of the current developed by each of the light detectors is in an appropriate and desired phase relationship with the amount and waveform of the currents developed by the other light detectors.

In order to make such an adjustment, the light must be directed along a line passing across the light and dark areas to adjust relative phase, while the gain or amount of light is adjusted independently. The gain adjustment is effected by moving the source of light at 90° to the line passing through the light and dark areas or by shuttering off part of the light. "Along a line", as used herein, means along any line whether curved or straight as long as it crosses the light and dark areas. Examples of light directing means which are readily independently adjustable are shutters with some sort of handle for movement into and away from the path of light, a lens with a handle which may be moved in front of and away from the light source so that the light can be focused through the lens to different locations toward the detector and a lens which is integral with the source such that movement of the source will also move the lens, thus directing the light to different locations.

In one embodiment of the invention, a means is provided for temporarily holding the directing means in a stable position. Examples of such a means for holding the directing means in a temporary stable position are springs and wires. Under certain circumstances, the holding means could be the stabilizing effects of gravity upon the position of the directing means. A particularly desirable embodiment is the use of lead wires to a light emitting diode light source provided with an integral lens. Movement of the light emitting diode will move the lens, and the lead wires to the light source will hold the light source and lens in a stable position. "Stable position" or "position stable", as used herein, means that the light directing means is held in a position which is stable relative to the light source and light detector.

In the situation where the light directing means is integral with the light source, the lens is clearly stable with respect to the position of light source. The lead wires hold the light source and lens in a position stable relative to the detector.

"Temporary position stable" means that the light directing means will not move when the device is handled gently for calibration, but can be easily moved for purposes of adjustment. This phase is intended in its broadest possible meaning and in certain applications, the device, following adjustment, may be sufficiently stable to be considered "permanently position stable" (as hereinafter defined).

"Permanently position stable" means that the light directing means is secured to hold it with sufficient strength for normal operation of the device, e.g., in a machine tool.

In some instances, it is desirable to make the light directing means permanently position stable after calibration of the device is complete. Any suitable means for making the light directing means permanently position stable can be used; however, a particularly suitable method is by cementing the light directing means in the device. Such cements may be inorganic or organic type cements. Particularly desirable cements for this purpose are polymeric in nature and are solvent soluble so that if later calibration is needed the cement can be dissolved and the light directing means can be re-adjusted.

The means for making the light directing means temporarily position stable and permanently position stable can be the same. In such a case, the light directing means can be easily and rapidly moved by releasing the means for making the light directing means position stable yet the light directing means is held position stable with enough strength to permit normal operation of the device when the position stable means is engaged.

When the detectors are calibrated relative to the light source, scale and directing means, the current outputs from the light detectors are aligned in a desired phase relationship to each other. In a preferred calibration, movement of the scale which is not permanently secured to the device, causes the output from the detectors to be in a sine waveform so that when one of the detectors is receiving a maximum amount of light through the transparent graduations, another of the detectors is receiving a minimum amount of light and two other detectors are receiving about 50 percent of the maximum amount of light. Movement of the scale then causes a movement of the sine waveform output, thus permitting counting of the graduations as they pass between the light sources and light detectors and which further permits calculation of motion of the scale which is even smaller than the width of the graduations due to the change in the form of the sine wave.

While the foregoing description and drawings represent the preferred embodiments of the present invention, it will be obvious to those skilled in the art that various changes and modifications may be made therein without departing from the true spirit and scope of the present invention.

What is claimed is:

1. A device for detecting alternating light and dark areas such as of a Vernier or Moiré interference pattern comprising:
   a plurality of paired light sources and light detectors, the detector of each of such pairs being positioned to receive light from the corresponding source of each of such pairs;
   an opaque scale having transparent graduations thereon;
   a grating having transparent graduations, wherein said scale and grating are movable relative to each other and wherein light from each light source is directed toward its corresponding detector through said scale and grating so that alternating light and dark areas in the form of an interference pattern are formed; and
   light directing means arranged to allow independent adjustment of the light emanating from each light source in a direction along a line passing through said light and dark areas, said light directing means thereby permitting independent adjustment during calibration of the relative phase of light detected by each of the light detectors independent of the amount of light received by said light detectors.

2. A device for detecting alternating light and dark areas such as of a Vernier or Moiré interference pattern comprising:
   a plurality of paired light sources and light detectors, the detector of each of such pairs being positioned to receive light from the corresponding source of each of such pairs;
   an opaque scale having transparent graduations thereon;
   a grating having transparent graduations, wherein said scale and grating are movable relative to each other and wherein light from each light source is directed toward its corresponding detector through said scale and grating so that alternating light and dark areas in the form of an interference pattern are formed; and
   light directing means arranged to allow independent adjustment of the light emanating from each light source in a direction along a line passing through said light and dark areas and for allowing independent adjustment of the amount of light reaching each corresponding detector, said light directing means thereby permitting independent adjustment during calibration of the amount and relative phase of light detected by each of the light detectors, said adjustment for relative phase and gain being substantially independent of each other.

3. The device of claim 2, wherein said light directing means includes metallic leads for supporting each light source, said leads capable of being bent to limit movement of said light source in a first direction along said line passing across light and dark areas of said interference pattern for adjusting the relative phase and in a second direction at approximately 90° to said first direction for adjusting the amount of light received by said detectors, said leads capable of substantially retaining their position after being bent.

4. The device of claim 1 or 2, wherein said light directing means comprises shutters which are independently movable between the source and the detector of each of said pairs for directing light from such source along said line and for controlling the amount of light which said detectors receive.

5. The device of claim 1 or 2, wherein said light directing means comprises lenses which are independently movable between the source and the detector of each of said pairs.

6. The device of claim 1 or 2, wherein said light directing means comprises mirrors which are independently movable to direct light from the source to the detector of each of said pairs.

7. The device of claim 1 or 2, wherein means is provided to render each of said light directing means temporarily position stable after an adjustment and means is provided to render said light directing means permanently position stable after calibration is completed.

8. The device of claim 7, wherein said means to render said light directing means permanently position stable comprises a solvent soluble polymeric cement securing the light directing means.

9. The device of claim 1 or 2, wherein each of the light sources and the light directing means for each source is integral with each other and the light directing means is adjustable by moving the combination of the directing means and the source.

10. The device of claim 5, wherein a protruding handle is secured to each lens and the lenses are movable by moving the handle, said handle and lens being mounted by spring retaining means.

11. The device of claim 1 or 2, wherein the interference pattern is in the form of a Vernier fringe.

12. The device of claim 1 or 2, wherein the interference pattern is in the form of a Moiré fringe.

13. The device of claim 3, wherein said light source is an LED.

14. The device of claim 1 or 2, wherein a frame is included to which said light sources and light detectors are affixed.

15. A method for adjusting the phase relationship of a plurality of paired light sources and light detectors in a device for detecting alternating light and dark areas resulting from light passing through transparent graduations along an opaque scale and transparent graduations on an opaque grating capable of moving relative to said scale, said light passing through said scale and grating forming a Vernier or Moiré interference pattern, wherein the detector of each of said pairs is positioned to receive light from the corresponding source of each of said pairs, said method comprising the steps of:
   (a) providing an independently adjustable light directing means between the source and detector of each of said pairs; and
   (b) independently adjusting at least one of said light directing means during calibration of said device to direct light at various locations along a line passing across said light and dark areas and toward the detector such that the relative phase of the light detected by the detectors may be changed without substantially changing the amount of light received by the detectors.

16. A method for adjusting the phase and gain relationships of paired light sources and light detectors in a device for detecting alternating light and dark areas resulting from light passing through transparent graduations along an opaque scale and transparent graduations on an opaque grating capable of moving relative to said scale, said light passing through said scale and grating forming a Vernier or Moiré interference pattern, wherein the detector of each of said pairs is positioned to receive light from the corresponding source of each of said pairs, said method comprising the steps of:
 (a) providing an independently adjustable light directing means between the source and detector of each of said pairs; and
 (b) independently adjusting at least one of said light directing means during calibration of said device to direct light at various locations along a line passing across said light and dark areas and toward the detector such that the the amount of light and relative phase of the light detected by the detectors may be changed, said relative phase and amount of light being adjustable substantially independent of each other.

17. The method of claim 15 or 16, wherein said step of adjusting the light directing means includes moving adjusting means which secure the light directing means to the device.

18. The method of claim 17, wherein said step of adjusting the light directing means is performed by integrally fixing said light directing means to the light source and by bending metallic electrical leads which connect the light source to the device in a first direction along said line and in a second direction approximately 90° with respect to said first direction to adjust the gain.

19. The method of claim 18, wherein said step of adjusting the light directing means includes holding said light directing means position stable by said metallic electrical leads following adjustment.

20. The method of claim 19, including the step of applying a solvent soluble glue to render the light directing means permanently position stable following calibration.

* * * * *